United States Patent
Tooher et al.

(10) Patent No.: US 12,376,151 B2
(45) Date of Patent: Jul. 29, 2025

(54) SHARED CHANNEL OCCUPANCY TIME OPERATION

(71) Applicant: InterDigital Patent Holdings, Inc., Wilmington, DE (US)

(72) Inventors: J. Patrick Tooher, Montreal (CA); Aata El Hamss, Laval (CA); Paul Marinier, Brossard (CA); Faris Alfarhan, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 382 days.

(21) Appl. No.: 17/635,189

(22) PCT Filed: Aug. 11, 2020

(86) PCT No.: PCT/US2020/045778
§ 371 (c)(1),
(2) Date: Feb. 14, 2022

(87) PCT Pub. No.: WO2021/030355
PCT Pub. Date: Feb. 18, 2021

(65) Prior Publication Data
US 2022/0225412 A1      Jul. 14, 2022

Related U.S. Application Data

(60) Provisional application No. 62/886,170, filed on Aug. 13, 2019.

(51) Int. Cl.
*H04W 74/0816* (2024.01)
*H04W 72/0453* (2023.01)
(Continued)

(52) U.S. Cl.
CPC ... *H04W 74/0816* (2013.01); *H04W 72/0453* (2013.01); *H04W 72/23* (2023.01); *H04W 72/56* (2023.01)

(58) Field of Classification Search
CPC ........ H04W 74/0816; H04W 72/0453; H04W 72/23; H04W 72/56; H04W 72/569;
(Continued)

(56) References Cited

U.S. PATENT DOCUMENTS

2017/0318595 A1* 11/2017 Dinan ................... H04L 5/0053
2020/0053777 A1*  2/2020 Babaei ................. H04W 16/14
(Continued)

FOREIGN PATENT DOCUMENTS

CN      110062464 A      7/2019
EP       3742835 A1     11/2020

OTHER PUBLICATIONS

3rd Generation Partnership Project (3GPP), R2-1710367, "Multiplexing of Data for AUL", Huawei, HiSilicon, 3GPP TSG-RAN WG2 Meeting #99bis, Prague, Czech Republic, Oct. 9-13, 2017, 4 pages.
(Continued)

*Primary Examiner* — Dady Chery
(74) *Attorney, Agent, or Firm* — Condo Roccia Koptiw LLP

(57) ABSTRACT

A wireless transmit/receive unit (WTRU) may monitor LBT subbands to determine when a COT is activated. A WTRU may vary monitoring based on whether the WTRU received a full or partial COT structure. A WTRU may interpret a scheduling grant based on the set of acquired LBT subbands. A WTRU may determine a channel access priority (CAP) associated with a COT. A WTRU may indicate a CAP used to acquire a COT. A WTRU may receive an indication of a CAP used by a network to start a COT. A WTRU may determine a logical channel restriction based on a CAP associated with the COT. A WTRU may determine whether a logical channel may be included in a transmission during
(Continued)

a COT based on a logical channel restriction. A transmission may be during a COT via a subband(s).

20 Claims, 9 Drawing Sheets

(51) Int. Cl.
*H04W 72/23* (2023.01)
*H04W 72/56* (2023.01)

(58) Field of Classification Search
CPC ......... H04W 72/1268; H04W 74/0808; H04W 74/0875; H04L 5/0053; H04L 1/1887
See application file for complete search history.

(56) References Cited

U.S. PATENT DOCUMENTS

2021/0368351 A1* 11/2021 Cui .................... H04W 74/0808
2022/0210827 A1* 6/2022 Wang .................... H04W 16/14

OTHER PUBLICATIONS

3rd Generation Partnership Project (3GPP), R2-1805723, "Channel Access Priority Classes for feLAA", Ericsson, 3GPP TSG-RAN WG2 #101-Bis Sanya, China, Apr. 16-20, 2018, 3 pages.

3rd Generation Partnership Project (3GPP), R2-1812340, "Configured Grant Enhancements for NR-U", MediaTek Inc., 3GPP TSG-RAN WG2 Meeting #103, Gothenburg, Sweden, Aug. 20-24, 2018, 3 pages.

3rd Generation Partnership Project (3GPP), R2-1906589, "On Channel Access Priority Class Selection in NR-U", Nokia, Nokia Shanghai Bell, 3GPP TSG-RAN WG2 Meeting #106, Reno, USA, May 13-17, 2019, 3 pages.

3rd Generation Partnership Project (3GPP), RP-182878, "New WID on NR-based Access to Unlicensed Spectrum", Qualcomm Inc., 3GPP TSG RAN Meeting #82, Sorrento, Italy, Dec. 10-13, 2018, 8 pages.

3rd Generation Partnership Project (3GPP), TR 38.889 V16.0.0, "Technical Specification Group Radio Access Network, Study on NR-Based Access to Unlicensed Spectrum (Release 16)", Dec. 2018, pp. 1-119.

3rd Generation Partnership Project (3GPP), TS 38.213 V15.3.0, "Technical Specification Group Radio Access Network, NR, Physical Layer Procedures for Control (Release 15)", Sep. 2018, pp. 1-101.

3rd Generation Partnership Project (3GPP), TS 38.214 V15.6.0, "Technical Specification Group Radio Access Network, NR, Physical Layer Procedures for Data (Release 15)", Jun. 2019, 1-105.

3rd Generation Partnership Project (3GPP), TS 38.321 V15.1.0, "Technical Specification Group Radio Access Network, NR, Medium Access Control (MAC) Protocol Specification (Release 15)", Mar. 2018, pp. 1-67.

3rd Generation Partnership Project (3GPP), TS 38.331 V15.6.0, "Technical Specification Group Radio Access Network, NR, Radio Resource Control (RRC) Protocol Specification (Release 15)", Jun. 2019, pp. 1-519.

* cited by examiner

SHARED CHANNEL OCCUPANCY TIME OPERATION

CROSS-REFERENCE TO RELATED APPLICATIONS

This application is the National Stage Entry under 35 U.S.C. § 371 of Patent Cooperation Treaty Application No. PCT/US2020/045778, filed Aug. 11, 2020, which claims the benefit of U.S. Provisional Application No. 62/886,170, filed Aug. 13, 2019, the contents of which are incorporated by reference herein.

BACKGROUND

Mobile communications using wireless communication continue to evolve. A fifth generation may be referred to as 5G. A previous (e.g., legacy) generation of mobile communication may be, for example, fourth generation (4G) long term evolution (LTE).

SUMMARY

Systems, methods, and instrumentalities are described herein for shared channel occupancy time (COT) operation.

In examples, a wireless transmit/receive unit (WTRU) may include a processor configured (e.g., programmed with executable instructions to implement a method) to determine a channel access priority (CAP) associated with a COT; determine a logical channel restriction based on the CAP associated with the COT; determine whether a logical channel is allowed to be included in a transmission that is to be sent by the WTRU during the COT using the logical channel restriction; and send the transmission during the COT via a subband, wherein the transmission includes the logical channel if the logical channel restriction allows the inclusion of the logical channel in the transmission.

The logical channel restriction may be performed, for example, by including the logical channel if the logical channel is associated with a CAP that is equal to or higher than the CAP associated with the COT and not including the logical channel if the logical channel is associated with a CAP that is lower than the CAP associated with the COT.

The CAP may indicate, for example, an LBT parameter used by a gNB to acquire the subband for the COT.

The CAP associated with the COT may be indicated, for example, by a channel access priority class (CAPC).

The CAP associated with the COT may be received, for example, in a scheduling grant that schedules a resource used for the transmission that is sent during the COT.

The logical channel may be multiplexed on a TB that is included in the transmission, for example, if the logical channel restriction allows the inclusion of the logical channel in the transmission, wherein the logical channel restriction allows the inclusion of the logical channel in the transmission if the logical channel is associated with a CAP that is equal to or higher than the CAP associated with the COT.

A WTRU processor may be further configured with executable instructions to implement the method to, further: receive a COT structure indication. The channel access priority associated with the COT may be determined based on the COT structure indication.

A WTRU processor may be further configured with executable instructions to implement the method to, further: receive an indication from a gNB via DCI. The channel access priority associated with the COT may be determined using the indication received via the DCI.

The channel access priority associated with the COT may be indicated by a reference signal configuration. A WTRU processor may be further configured with executable instructions to implement the method to, further: determine a first channel access priority based on a first reference signal configuration; and determine a second channel access priority based on a second reference signal configuration that differs from the first reference signal configuration.

A WTRU processor may be further configured with executable instructions to implement the method to, further: determine a resource that occurs during the COT, wherein the transmission is sent using the resource.

A WTRU processor may be further configured with executable instructions to implement the method to, further: determine a logical channel (LCH) priority associated with the logical channel; and determine whether the logical channel is associated with a channel access priority that is equal to or higher than the channel access priority associated with the COT based on the LCH priority associated with the logical channel and the channel access priority associated with the COT. The determination of whether the logical channel is allowed to be included in the transmission by the WTRU during the COT may be based on the determination of whether the logical channel is associated with a channel access priority that is equal to or higher than the channel access priority associated with the COT.

In examples, methods may be implemented for shared COT operation. Methods may be implemented (e.g., in whole or in part), for example, by one or more devices, apparatuses, and/or systems (e.g., a WTRU, a network node such as a base station including a gNodeB (gNB), and/or the like), which may comprise one or more processors configured to execute the methods (e.g., in whole or in part) as computer executable instructions that may be stored on a computer readable medium or a computer program product, that, when executed by the one or more processors, performs the methods. The computer readable medium or the computer program product may comprise instructions that cause one or more processors to perform the methods by executing the instructions.

A wireless transmit/receive unit (WTRU) may monitor a one or more LBT subbands to determine when a COT is activated. A WTRU may be configured to monitor one or more (e.g., a subset) of contention-based subbands to determine whether a channel is occupied. For example, a WTRU may (e.g., be configured to) monitor a set/subset of listen-before-talk (LBT)/unlicensed subbands to determine whether a channel is occupied, which may indicate an association with a COT being activated. A WTRU may (e.g., be configured to) monitor one or more (e.g., some or all) LBT subbands, for example, for an indication associated with a COT. In examples, a WTRU may be configured to monitor multiple (e.g., all) LBT subbands simultaneously.

A WTRU may receive an indication of a COT structure for a channel. The WTRU may monitor one or more (e.g., a set of) LBT subbands within a COT based on whether the WTRU has detected, determined or received an indication of a full or partial COT structure. A WTRU may be configured to receive a transmission in an LBT subband, which may indicate the subband has been acquired. The WTRU may stop hopping and/or may continue monitoring physical downlink control channel (PDCCH) candidates in the acquired LBT subband. For example, a WTRU may (e.g., upon reception of a transmission in an LBT subband indicating the subband has been acquired) stop hopping and/or may continue monitoring the PDCCH candidates in the acquired LBT subband, e.g., until receiving an indication about a full set of acquired LBT subbands.

A WTRU may interpret a scheduling grant based on the set of acquired LBT subbands. A WTRU may receive and/or interpret scheduling information. For example, a WTRU may be configured to determine scheduling information based on one or more LBT subbands that are associated with an active COT. A WTRU's interpretation of a resource allocation in a scheduling grant may be a function of the number and/or set of acquired LBT subbands.

A WTRU may (e.g., be configured to) operate, for example, with a first (e.g., relatively large) set of configured control resource sets (CORESETs) and a second (e.g., smaller) set of active CORESETs. A WTRU may be configured with multiple CORESETs. A WTRU may be configured to monitor (e.g., in a variety of ways) some or all of the multiple CORESETs. A WTRU may receive a first indication at the start of a COT indicating, for example, that a subset of LBT subbands are active.

A WTRU may determine parameters of an LBT process for a transmission within a COT based on priority of transmission. The priority may depend on previous transmissions or transmission type.

A WTRU may indicate a channel access priority class (CAPC) used to acquire a COT. A WTRU may monitor for the presence of a signal indicating the CAPC used to acquire the COT. A WTRU may receive an indication of a CAPC used to start a COT. A WTRU may receive an indication in a scheduling grant of a CAPC used by the network (e.g., if and/or when acquiring an ongoing COT). A WTRU may determine data with applicable/sufficient priority to transmit in a COT. A WTRU may determine a restricted set of logical channels that the WTRU may use to build a transport block (TB) for a scheduled transmission in a COT.

A WTRU may be given logical channel restrictions for an uplink (UL) transmission within a COT. A WTRU may receive an instruction with a logical channel restriction, for example, in scheduling downlink control information (DCI). A WTRU may determine the logical channels whose data may be included in the uplink transmission. For example, the WTRU may determine the logical channels whose data may be included in the uplink transmission based on the restriction.

DETAILED DESCRIPTION

Figure 1A:
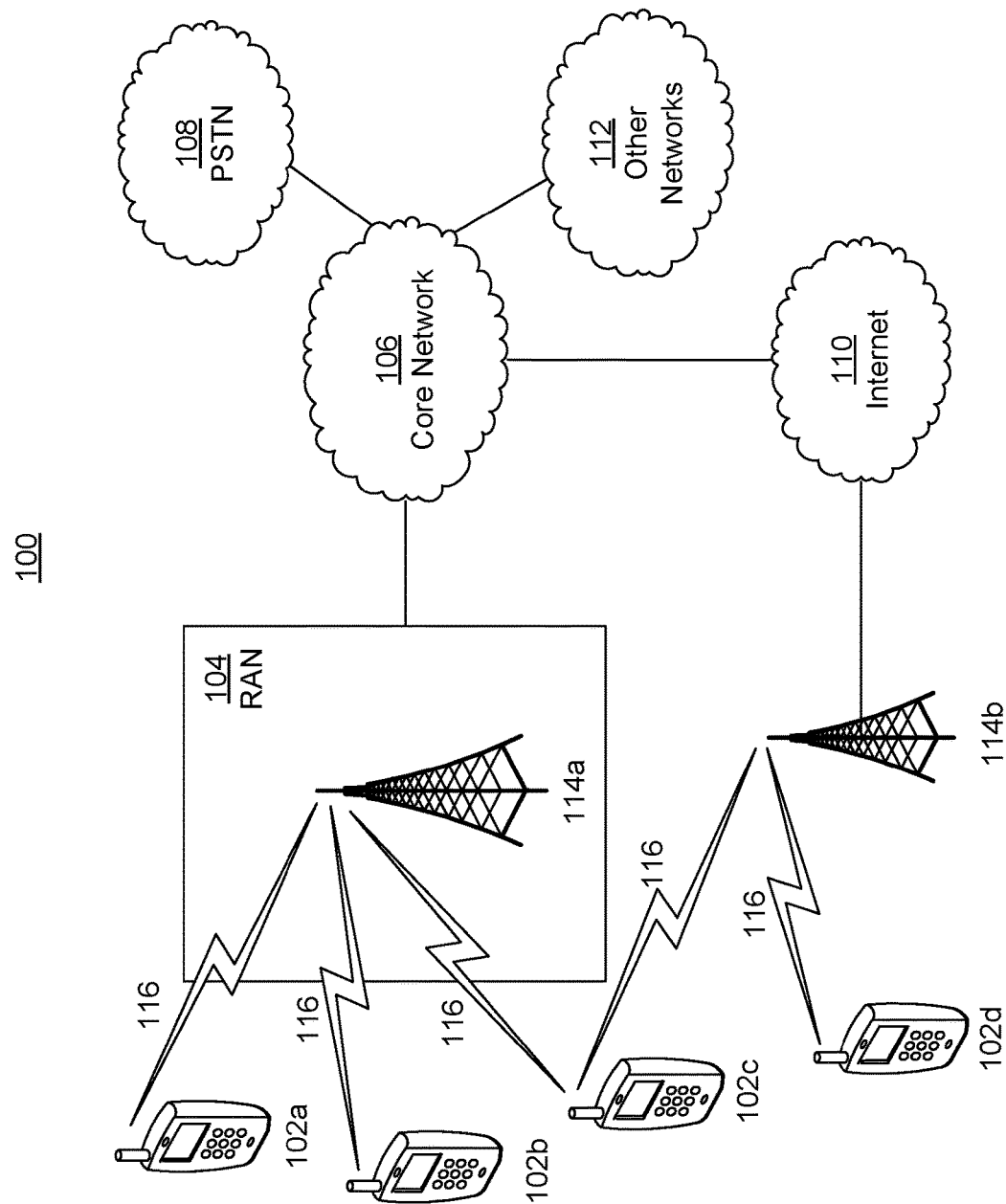
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
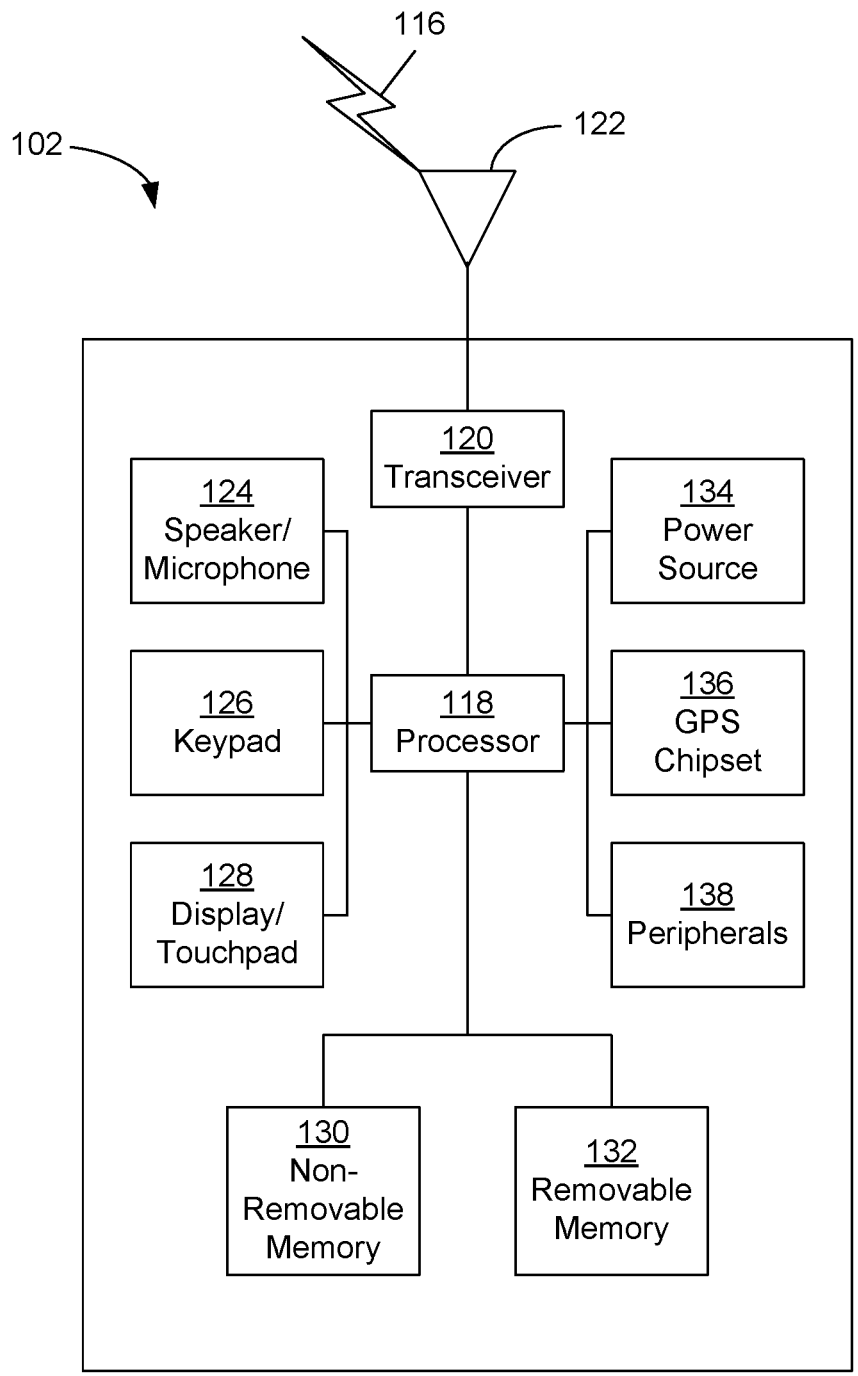
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ M IMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
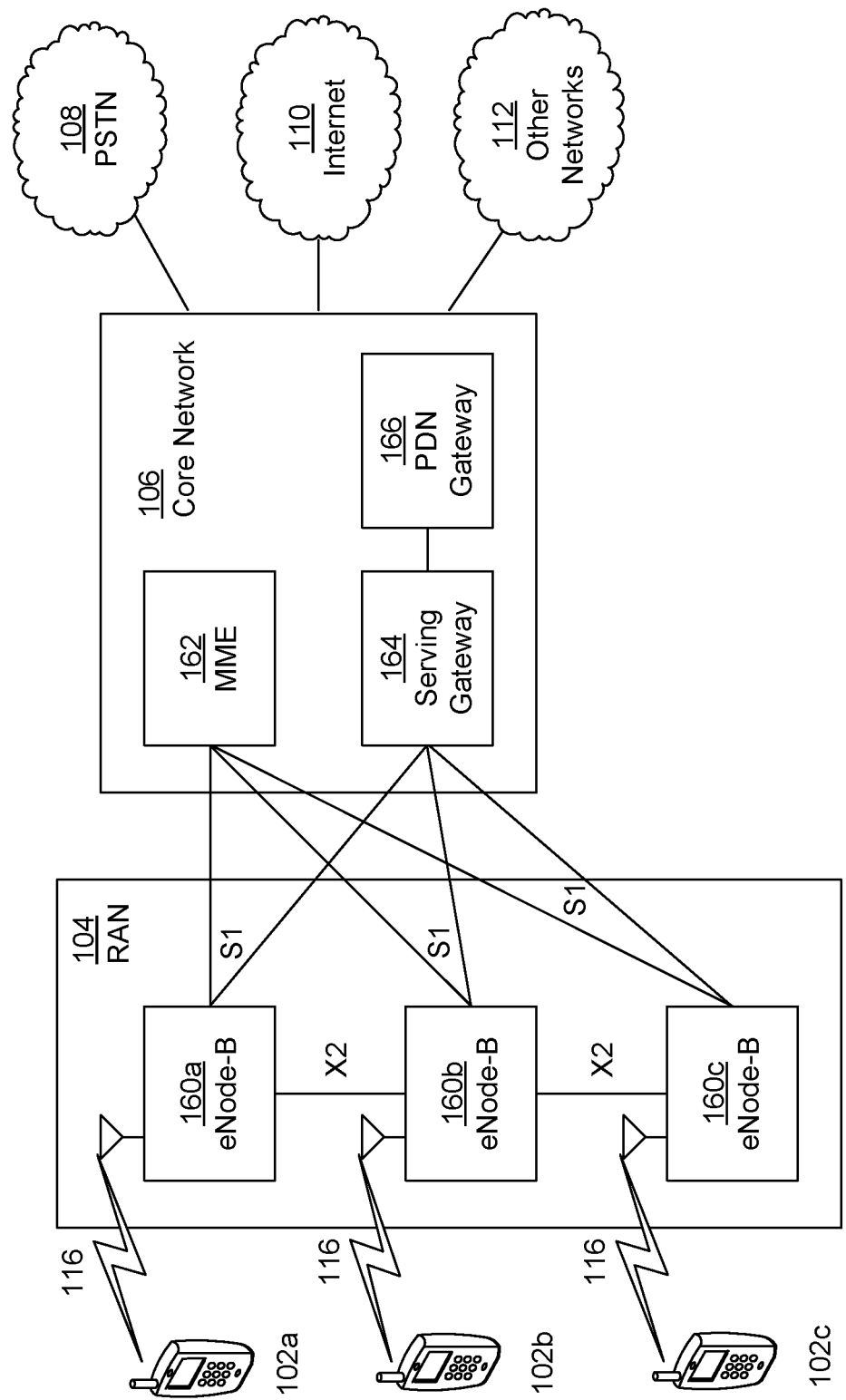
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
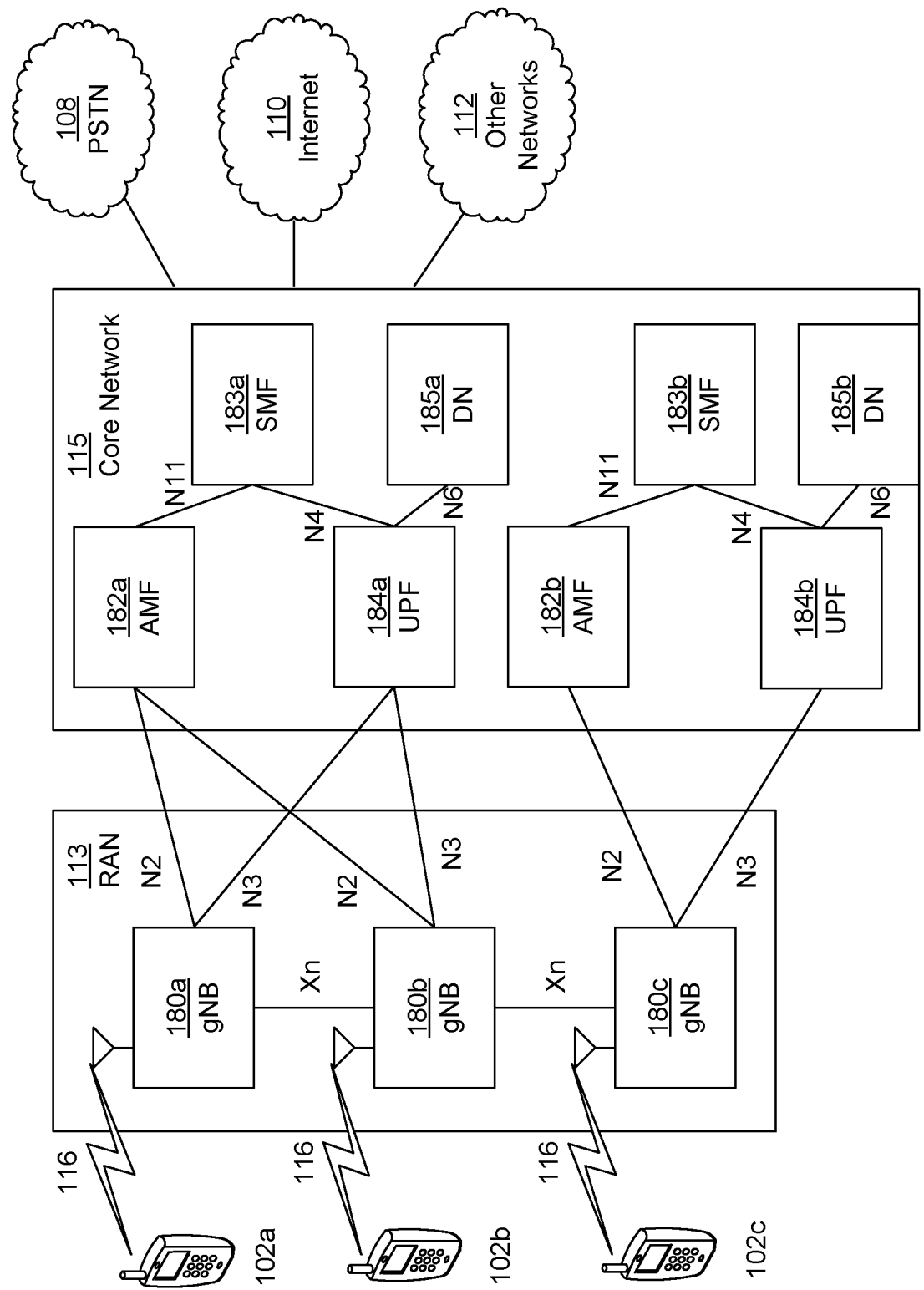
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Unlicensed operation may include operation in an unlicensed frequency band. Operation in an unlicensed frequency band may be based on (e.g., subject to limitations or restrictions on) transmit power control (TPC), radio frequency (RF) output power, and/or power density, which may be given (e.g., determined) by the mean effective isotropic radiated power (EIRP) and/or the mean EIRP density (e.g., at the highest power level). Operation in an unlicensed frequency band may (e.g., also) be based on (e.g., subject to requirements on) transmitter out of band emissions. Requirements may be specific to bands and/or geographical locations.

Operation (e.g., in an unlicensed frequency band) may (e.g., also) be based on (e.g., subject to requirements on) a nominal channel bandwidth (NCB) and/or an occupied channel bandwidth (OCB) that may be used for unlicensed spectrum, for example, in the 5 GHz region. The NCB (e.g., the widest band of frequencies inclusive of guard bands assigned to a single channel) may be at least 5 MHz, for example, at all times. The OCB (e.g., the bandwidth containing 99% of the power of a signal) may be, for example, between 80% and 100% of the declared NCB. A device (e.g., during an established communication) may (e.g., be allowed to) operate (e.g., temporarily) in a mode where the device's OCB may be reduced, for example, to as low as 40% of the device's NCB, e.g., with a minimum of 4 MHz.

Channel access in an unlicensed frequency band may use listen-before-talk (LBT). LBT may be utilized, for example, regardless whether a channel is or is not occupied.

LBT may be characterized (e.g., for frame-based systems) using one or more of a clear channel assessment (CCA) time (e.g., ~20 µs), a channel occupancy time (e.g., minimum 1 ms, maximum 10 ms), an idle period (e.g., minimum 5% of channel occupancy time), a fixed frame period (e.g., equal to the channel occupancy time plus an idle period), a short control signaling transmission time (e.g., maximum duty cycle of 5% within an observation period of 50 ms), and/or a CCA energy detection threshold.

A transmit/receive structure may not be fixed in time, for example, for a load-based system. An LBT may be characterized (e.g., in a load-based system), for example, using a number N corresponding to the number of clear idle slots in an extended CCA (e.g., rather than characterizing LBT with a fixed frame period). In some examples, N may be selected randomly within a range.

Operating environments and/or features may be categorized into a variety of deployment scenarios, which may include, for example, different standalone new radio (NR)-based operation, different variants of dual connectivity operation (e.g., E-UTRAN NR (EN)-dual connectivity (DC) with at least one carrier operating according to the LTE radio access technology (RAT) or NR-DC with at least two sets of one or more carriers operating according to the NR RAT), and/or different variants of carrier aggregation (CA) (e.g., different combinations of zero or more carriers of LTE and NR RATs).

Operational (e.g., functional) features may include, for example, one or more of the following (e.g., to support license assisted access (LAA)): listen-before-talk (LBT) for a clear channel assessment (CCA), discontinuous transmission on a carrier with limited maximum transmission duration, carrier selection, transmit power control (TPC), radio resource management (RRM) measurements (e.g., including cell identification), and/or channel state information (CSI) measurements (e.g., including channel and interference).

An LBT procedure may include applying a CCA check before using a channel. A CCA may (e.g., utilize at least energy detection to) determine the presence or absence of other signals on a channel, for example, to determine if a channel is occupied or clear, respectively. LBT may be used in unlicensed bands. Carrier sensing via LBT may support fair sharing of unlicensed spectrum.

Discontinuous transmission on a carrier and/or limited maximum transmission duration may be implemented, for example, to promote fair use. Channel availability may not be guaranteed, e.g., in unlicensed spectrum. Continuous transmission may be prohibited and/or limits may be imposed on the maximum duration of a transmission burst (e.g., to promote channel availability in unlicensed spectrum in some geographical regions).

Carrier selection may be implemented, for example, to reduce interference. There may be a relatively large available bandwidth of unlicensed spectrum. Carrier selection may be used by nodes to select carriers, for example, with low interference, which may support co-existence with other unlicensed spectrum deployments.

TPC may be implemented to adjust transmit power. A transmitting device may reduce transmit power, for example, 3 dB or 6 dB compared to a maximum nominal transmit power.

RRM measurements (e.g., including cell identification) may be implemented, for example, to support mobility. RRM measurements (e.g., including cell identification) may enable mobility between serving cells (SCells) and/or robust operation in an unlicensed band.

CSI measurements (e.g., including channel and interference) may be implemented, for example, to support frequency/time estimation and/or synchronization. A WTRU operating in an unlicensed carrier may support frequency/time estimation and/or synchronization, for example, to support RRM measurements and (e.g. successful) reception of information on an unlicensed band.

A WTRU may be configured to operate in unlicensed bands. For example, NR operation may be supported in an unlicensed band. Operation (e.g., NR operation) in unlicensed spectrum may include, for example, one or more of the following: initial access, scheduling/hybrid automatic repeat request (HARQ), mobility, and/or coexistence methods (e.g., with LTE and other RATs). Deployment scenarios may include, for example, different variants of standalone NR-based operation, different variants of dual connectivity operation (e.g., EN-DC with at least one carrier operating according to the LTE RAT or NR DC with at least two sets of one or more carriers operating according to the NR RAT), and/or different variants of carrier aggregation (CA) (e.g., different combinations of zero or more carriers of LTE and NR RATs).

NR-U may support multiple (e.g., four) categories of channel access schemes for NR unlicensed spectrum (e.g., for NR-U) operations. Channel access categories may include, for example, immediate transmission after a short switching gap (e.g., category 1), LBT without random back-off (e.g., category 2), LBT with random back-off with fixed and variable contention widow size (e.g., category 3 and 4, respectively).

In one or more examples, LBT may be performed using CCAs on LBT subbands (e.g., 20 MHz subbands). A bandwidth part (BWP) may be, for example, one or more subbands (e.g., a single LBT subband or multiple LBT subbands).

A channel occupancy time (COT) may be the time for which a channel has been acquired for transmission. A COT may be acquired by a node (e.g., a WTRU or gNB). A COT may be shared with another node. In one or more examples, a total COT duration (e.g., including any sharing) may not exceed a maximum COT.

A node (e.g., in NR-U) may perform LBT prior to acquiring an unlicensed channel. A COT may start, for example, upon acquisition of an unlicensed channel. A COT may last up to a configured maximum amount of time. A COT may be shared between the original transmitter and receiver, for example, enabling bi-directional transmissions during a COT. For example, a WTRU may acquire a COT (e.g. a WTRU-acquired COT) for a UL transmission. The WTRU-acquired COT may be shared with a gNB, such that the gNB may transmit to the WTRU, and/or to other WTRUs, in some resources of the WTRU-acquired COT. For example, a gNB may acquire a COT (e.g. a gNB-acquired COT) for a DL transmission. The gNB-acquired COT may be shared with one or more WTRUs for (e.g., subsequent) UL transmission(s).

COTs may span multiple LBT subbands. Techniques and/or approaches may be used to determine and/or indicate (e.g., to a WTRU) the set of LBT subbands for which a COT is active. A gNB (e.g., without a determination or indication) may not be aware of a set of acquired LBT subbands prior to building the COT structure indication, e.g., to be transmitted at the beginning of a COT. A WTRU (e.g., without a determination or indication) may not be informed about the set of LBT subbands, e.g., at least at the beginning of a COT. An LBT subband, e.g., where an indication of an acquired COT may be transmitted, may not be known or determined (e.g., without a determination or indication). COT durations may be limited. Efficient use of one or more (e.g., some or all) subbands during limited COT durations (e.g., including at the beginning of the COT) may depend on techniques and/or approaches to determine and/or indicate the set of LBT subbands for which a COT is active.

Some COTs may be shared, for example, by multiple WTRUs. Techniques and/or approaches may be used to support fairness (e.g., COT distribution or use) among WTRUs, for example, if and/or when acquiring a channel for UL transmissions, e.g., at COT switching points. Techniques and/or approaches may be used for (e.g., distribution or use of) configured grant (CG) resources that fall within a COT.

A COT may be acquired, for example, using a channel access priority. The channel access priority may include channel access priority class (CAPC). The channel access priority may determine or indicate a parameter or parameters associated with LBT (LBT parameter). The LBT parameter may be used (e.g., by a base station) to acquire the subband for the COT. The base station may include gNodeB. In examples, a COT may not be used for information or data associated with a lower priority than a priority associated with (e.g., used to determine) the selection of the CAPC. A gNB (e.g., without a determination or indication) may be unaware of the CAPC used to acquire a COT and may be unaware of the allowed data priority for a COT, for example, for WTRU-acquired COTs. A transmitting WTRU (e.g., without a determination or indication) may be unaware of the priority of data allowed to be included for (e.g., UL) transmissions within a COT acquired by another (e.g., not acquired by the transmitting WTRU).

A WTRU may be configured (e.g., based on determination or indication of a COT structure) to operate in wideband. A WTRU may determine or receive an indication associated with a COT. A determination or indication may indicate a COT structure. For example, a WTRU may receive COT structure indication for wideband operation. Determination and indication may be used interchangeably. A WTRU may receive a COT structure indication and determine a channel access priority associated with the COT based on the COT structure indication.

A WTRU may be configured to (e.g., simultaneously/concurrently) monitor multiple (e.g., some or all) LBT subbands, for example, for one or more indications associated with one or more COTs. In examples, a WTRU may be configured to simultaneously monitor the (e.g., all) LBT subbands of a carrier. A WTRU may be configured with multiple sets of physical downlink control channel (PDCCH) monitoring occasions. A WTRU may be (e.g., additionally and/or alternatively) configured with multiple control resource sets (CORESETs) or search spaces. In examples, a WTRU may be configured with multiple (e.g., multiple sets of) PDCCH monitoring occasions (e.g., or CORESETs or search spaces). In examples, there may be a set of PDCCH monitoring occasions (e.g., or CORESETs or search spaces) per LBT subband. A WTRU may determine a set of active LBT subbands, for example, based on one or more LBT subbands. A WTRU may determine a set of active LBT subbands, for example, based on the LBT subband(s) where the WTRU has (e.g., successfully) received a demodulation reference signal (DM-RS) and/or a PDCCH (e.g., a group common PDCCH (GC-PDCCH)). A set of active LBT subbands may be active, for example, during a portion of a (e.g., present) COT or for the entire duration of a (e.g., present) COT.

A WTRU may receive a COT indication in one or more (e.g., multiple) LBT subbands associated with a COT. A WTRU may receive a COT structure indication in one or more LBT subbands, for example, where the WTRU has detected an active COT. A COT structure indication may or may not include an indication of the set of acquired LBT subbands. A WTRU may (e.g., expect to) receive a (e.g., different, additional, subsequent or future) COT structure indication that (e.g., explicitly) indicates a set of acquired LBT subbands. A different, additional, subsequent or future COT structure indication (e.g., relative to an earlier or first COT structure indication) may include, for example, a COT structure indication transmitted within the same COT (e.g., as the earlier or first COT structure indication). Multiple COT structure indications may enable or otherwise support redundancy.

A WTRU may receive one or more COT indications in one or more (e.g., multiple) LBT subbands, for example, where (e.g., in which) the WTRU has detected a COT. In examples, a WTRU may receive a COT structure indication in (e.g., each of) multiple LBT subbands. Each of multiple COT structure indications may include the same or different information. In examples, (e.g., a WTRU may assume that) multiple (e.g., some or all) COT structure indications may have the same information, which may enable or otherwise support one or more of the following: energy accumulation, Chase combining and/or improved demodulation of the COT structure indication.

A WTRU may (e.g., be configured to) monitor one or more (e.g., a subset) of LBT subbands, for example, for an indication associated with a COT.

A WTRU may be configured with one or more (e.g., a subset of) LBT subbands. A WTRU may be configured with one or more (e.g., a subset of) LBT subband(s) on which the WTRU may have one or more PDCCH monitoring occasions (e.g., when there is not an active COT). A WTRU may monitor one or more (e.g., a set of) default LBT subbands (e.g., as described herein). A WTRU may (e.g., be configured to) monitor one or more default LBT subbands, for example, to (e.g., attempt to) detect a DM-RS and/or a PDCCH transmission.

A WTRU may be configured with resources in one or more (e.g., multiple) LBT subbands. A WTRU may be configured with, for example, one or more (e.g., a set of) CORESETs, search spaces, and/or PDCCH candidates in multiple LBT subbands. A WTRU may (e.g., in a/any given instance, such as one or more slots or time periods) actively monitor (e.g., only) the CORESET(s), search space(s), and/or PDCCH candidate(s) in one or more LBT subbands (e.g., one or more LBT subbands deemed default LBT subband (s)). For example, in any one or more slots or time periods, a WTRU may actively monitor only the CORESET(s), search space(s), and/or PDCCH candidate(s) in default LBT subband(s). Default LBT subband(s) may change (e.g., over time). For example, a WTRU may be configured with (e.g., and may use) a hopping pattern to change a default LBT subband (e.g., over time, such as periodically, aperiodically, on a schedule or as needed/ad hoc). A hopping pattern may be determined and/or indicated. A hopping pattern may be a function of, for example, one or more of a slot number, time, a WTRU identifier (ID), and/or the like. A hopping pattern may be (e.g., explicitly) indicated (e.g., via a bitmap in a configuration).

A WTRU may be configured to receive an indication (e.g., in a transmission in an LBT subband) indicating a subband has been acquired. A WTRU may stop hopping and/or may continue monitoring PDCCH candidates in an acquired LBT subband. For example, a WTRU, upon reception of a transmission in an LBT subband indicating the subband has been acquired, may stop hopping and may continue monitoring PDCCH candidates in the acquired LBT subband, for example, until the WTRU receives an indication about a full set of acquired/active LBT subbands. In an (e.g., additional and/or alternative) example, a WTRU may (e.g., until further determination and/or indication) stop its out-of-COT monitoring and/or may monitor a confirmed active LBT subband (e.g., using a monitoring pattern applicable to an active COT on an LBT subband), for example, based on (e.g., upon) reception of an indication (e.g., in a transmission in an LBT subband, such as the confirmed active LBT subband) indicating a subband (e.g., the confirmed active LBT subband) has been acquired. In an (e.g., additional and/or alternative) example, a WTRU may (e.g., until further determination and/or indication) stop its out of COT monitoring and/or may monitor one or more (e.g., some or all) configured subbands (e.g., using a monitoring pattern applicable to an active COT on one or more (e.g., all) LBT subbands), for example, upon reception of an indication (e.g., in a transmission in an LBT subband) indicating the subband has been acquired. A WTRU may remove one or more LBT subbands from monitoring for a current COT, for example, based on further determination and/or indication.

Figure 2:
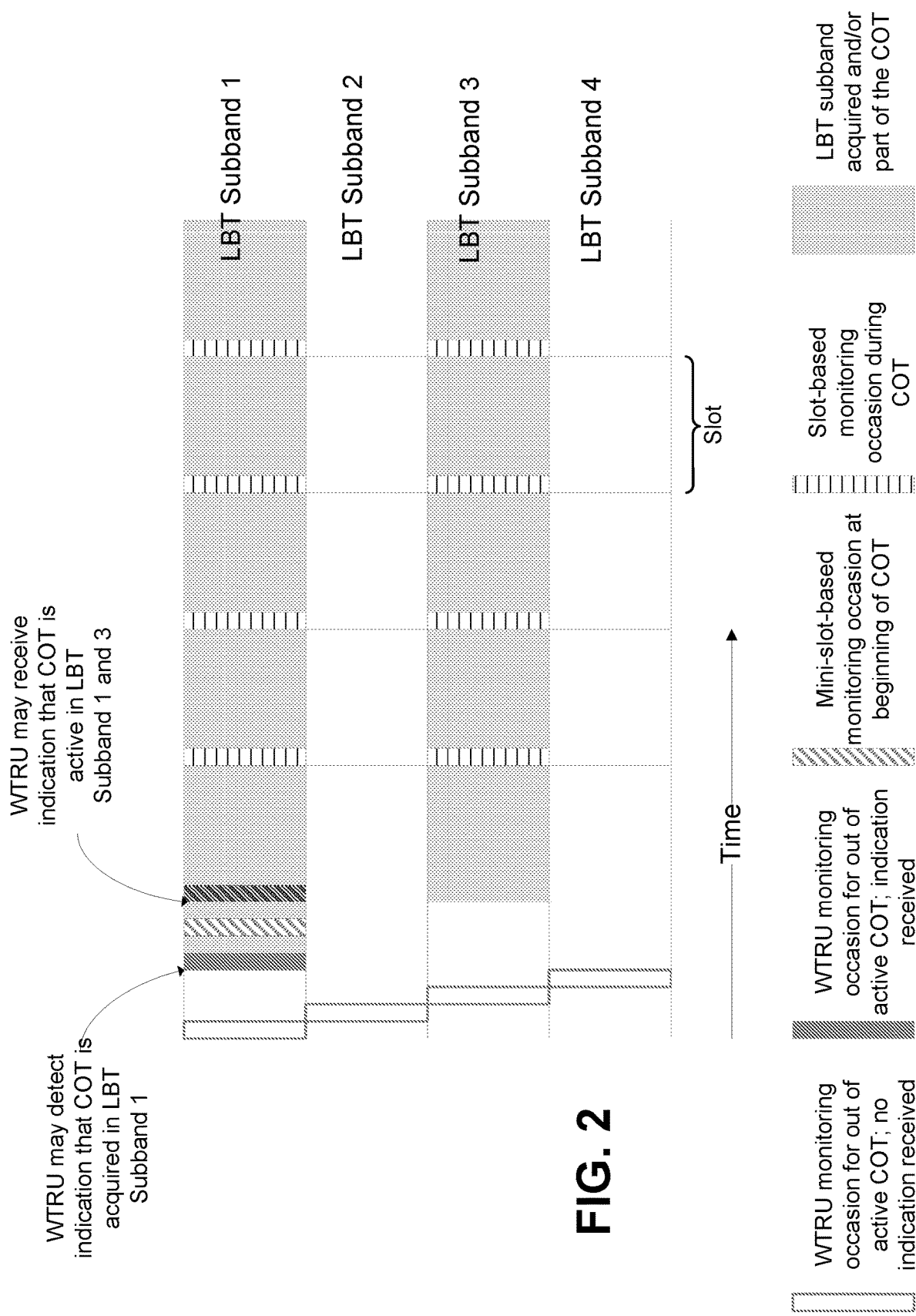
FIG. 2 illustrates an example of a WTRU hopping pattern to monitor multiple LBT subbands.

FIG. 2 illustrates an example of a WTRU hopping pattern to monitor multiple LBT subbands. A WTRU may (e.g., as shown by example operation in FIG. 2) monitor multiple LBT subbands (e.g., in a hopping pattern), and/or may change monitoring to monitor on one or more acquired LBT subbands, for example, until receiving an indication of a full set of acquired LBT subbands. A WTRU may monitor on configured LBT subbands (e.g., LBT subbands 1-4), for example (e.g., as shown by example in FIG. 2), hopping between subbands until the WTRU detects an indication on an LBT subband (e.g., LBT subband 1). The indication may be provided, for example, in a GC-PDCCH and/or a DM-RS. A WTRU may be or become aware that an LBT subband on which an indication is detected is acquired for the COT, for example, if and/or when the WTRU detects the indication (e.g. on LBT subband 1). Additional LBT subbands may or may not be acquired. A WTRU may switch to mini-slot monitoring (e.g., of an acquired LBT subband), for example, until the next slot boundary. As shown in FIG. 2, the WTRU may switch to mini-slot monitoring of LBT subband 1. The WTRU may (e.g., at some point) receive an indication informing the WTRU about a full set of acquired LBT subbands for the COT. As shown by example in FIG. 2, the WTRU may receive an indication about a full set of acquired LBT subbands for the COT at the beginning of the next slot after beginning mini-slot monitoring. As shown by example in FIG. 2, the WTRU may receive a COT structure indication informing the WTRU that LBT subbands 1 and 3 are (e.g., a full set of) acquired LBT subbands for the COT. The WTRU may switch from mini-slot monitoring, for example, to slot-based monitoring (e.g., in some or all acquired LBT subbands). For example, as shown by example in FIG. 2, a WTRU may switch (e.g., based on the full-set indication) from mini-slot monitoring of LBT subband 1 to slot-based monitoring of acquired/active LBT subbands 1 and 3 during the COT.

Figure 3:
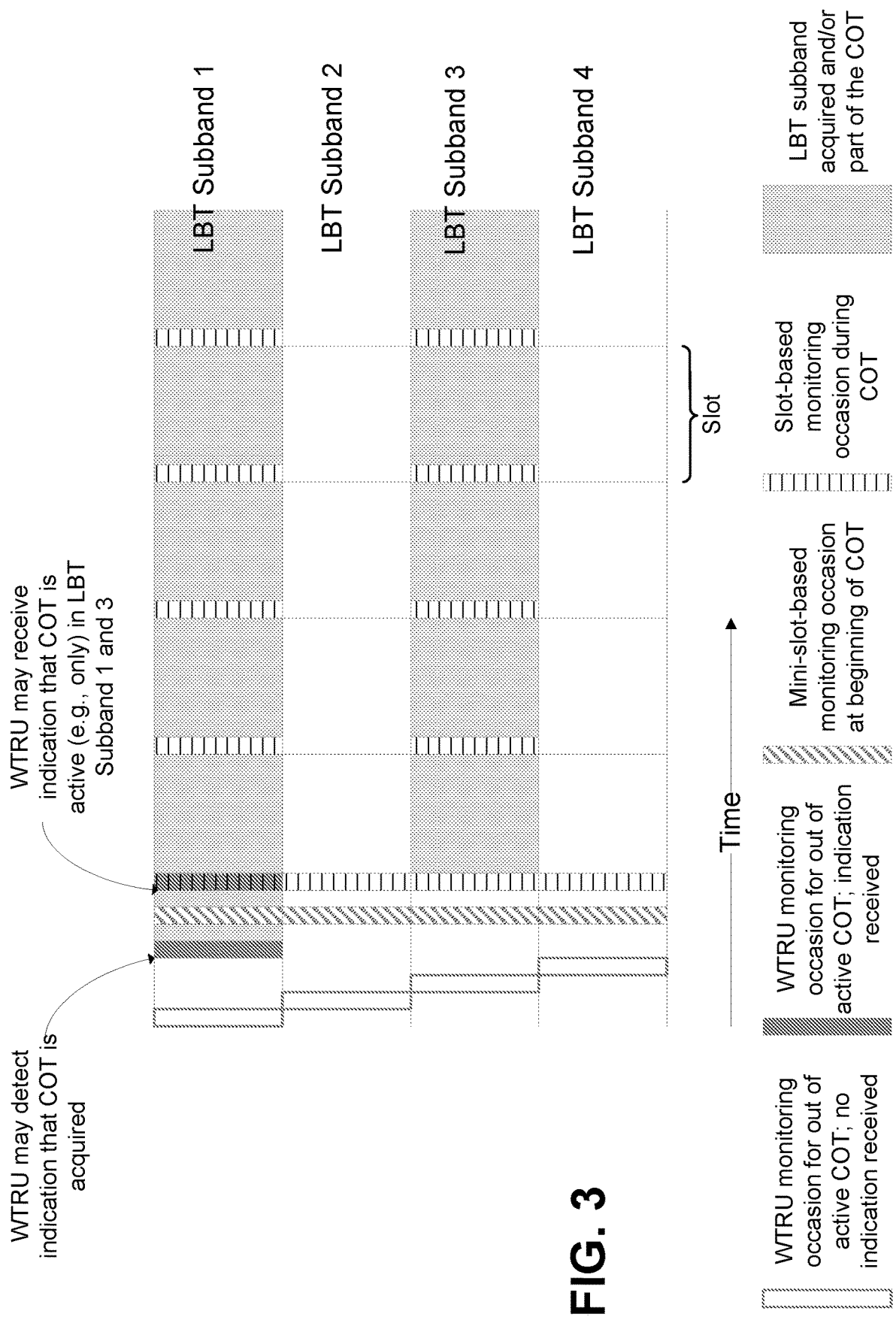
FIG. 3 illustrates an example of a WTRU hopping pattern to monitor multiple LBT subbands.

FIG. 3 illustrates an example of a WTRU hopping pattern to monitor multiple LBT subbands. A WTRU may (e.g., as shown by example operation in FIG. 3) monitor multiple LBT subbands (e.g., subbands 1-4 in a hopping pattern), and/or may change monitoring (e.g., from a hopping pattern to mini-slot monitoring) of LBT subbands (e.g., including one or more unacquired subbands), based on an indication of one or more acquired subbands, for example, until receiving an indication of a full set of acquired LBT subbands. A WTRU (e.g., based on example operation shown in FIG. 3) may (e.g., be configured to) behave similarly to another WTRU (e.g., based on example operation shown in FIG. 2), for example, until the WTRU detects an indication on at least one LBT subband (e.g., LBT subband 1) that one or more LBT subbands are acquired. In an example (e.g., as shown in FIG. 3), the WTRU may switch or change monitoring based on the indication to monitor some or all LBT subbands (e.g., using mini-slot-based monitoring) until further notice (e.g., until detecting a full COT structure indication). The WTRU may be informed by an indication (e.g., a full COT structure indication) received, for example, at the beginning of the next slot (e.g., as shown by example in FIG. 2). The indication may indicate, for example, that LBT subbands 1 and 3 are acquired/active for a COT. The WTRU may modify its PDCCH monitoring activity (e.g., based on the indication) accordingly (e.g., from mini-slot-based monitoring of subbands 1-4 to slot-based monitoring of active subbands 1 and 3, as shown by example in FIG. 3). The one or more indications of acquired COT subbands and adaptive subband monitoring based on the indications may support efficient use of acquired/active subbands during a COT.

A WTRU may be configured to perform hierarchical monitoring, for example, for an indication associated with a COT. A WTRU may monitor a subset of LBT subbands, for example, without an active COT. A WTRU may modify a set of monitored LBT subbands. A WTRU may (e.g., reassess or make a determination whether to) adapt (e.g., maintain or modify/change) a set of monitored LBT subbands, for example, at a (e.g., every) monitoring instance. Selection of monitored LBT subbands (e.g., at an instance) may be determined, for example, based on one or more of the following: the set of active LBT subbands in a previous COT; a previously monitored set of LBT subbands; a preconfigured monitoring pattern; an indication received in a discovery reference signal (DRS); an outcome of an LBT process or measurement; an indication received in a prior COT; an indication received outside of COT; and/or the like.

Selection of monitored LBT subbands at an instance may be determined (e.g., at least in part), for example, based on the set of active LBT subbands in a previous COT. For example, a WTRU may be aware of a previous COT that occupied a first set of LBT subbands. A WTRU may monitor at least one CORESET/search-space/PDCCH candidate from at least one of previously used LBT subband. A previously used set of LBT subbands may be valid for a certain time. For example, the validity of a previously used set of LBT subbands may depend on the time elapsed since a COT expired. A WTRU may maintain a timer for one or more LBT subbands. For example, upon the expiry of the timer, the WTRU may remove an LBT subband from a list of monitored LBT subbands. A WTRU may return to a default set of LBT subbands, for example, upon the expiry of a timer.

Selection of monitored LBT subbands at an instance may be determined (e.g., at least in part), for example, based on a previously monitored set of LBT subbands. A WTRU may monitor a first set of LBT subbands in a first time instance. The WTRU may determine a second set of LBT subbands in a second time instance (e.g., subsequent to the first time instance), for example, as a function of one or more of the first set of LBT subbands; whether the WTRU detected a transmission in any of the LBT subbands monitored in the first time instance(s); the one or more (e.g., set of) LBT subbands where the WTRU detected a transmission; and/or the like.

Selection of monitored LBT subbands at an instance may be determined (e.g., at least in part), for example, based on a preconfigured monitoring pattern. In examples, a pattern may be semi-statically configured by the network.

Selection of monitored LBT subbands at an instance may be determined (e.g., at least in part), for example, based on an outcome of an LBT process and/or measurement. In examples, an LBT process and/or measurement may be performed by the WTRU.

Selection of monitored LBT subbands at an instance may be determined (e.g., at least in part), for example, based on an indication received outside of a COT. In examples, an indication may be received after completion of the most recent COT.

A WTRU may be configured to perform wideband monitoring, for example, for an indication associated with a COT. A WTRU may be configured to monitor a wideband transmission. A WTRU may be configured to monitor a wideband transmission for an indication of a gNB-acquired COT. For example, a WTRU may monitor a wideband DM-RS and/or GC-PDCCH, which may be transmitted on multiple LBT subbands. A WTRU may determine the presence of an active COT in at least one LBT subband, for example, if the wideband transmission is present in at least one LBT subband. For example, a WTRU may detect the presence of components of a wideband DM-RS. A WTRU may (e.g., be able to) determine the set of LBT subbands, for example, where the wideband DM-RS has been transmitted. A WTRU may (e.g., be configured to) deem a subband where the wideband DM-RS (or GC-PDCCH) has been received as being part of a COT. In examples, a WTRU may deem a (e.g., any) subband where a wideband DM-RS (e.g., and/or GC-PDCCH) has been received as being part of an acquired COT (e.g., a newly acquired COT).

A WTRU may (e.g., be configured to) perform monitoring, for example, based on a multi-step (e.g., a two-step) indication of a set of LBT subbands. A WTRU may monitor one or more LBT subbands to determine the use of at least one LBT subband for a COT, for example, using one or more approaches described herein. A WTRU may modify the WTRU's CORESET, search space and/or PDCCH candidate monitoring, for example, based on a determination that at least one LBT subband has been acquired for a COT. A WTRU may (e.g., upon determining that at least one LBT subband has been acquired for a COT) modify its CORESET, search space and/or PDCCH candidate monitoring, for example, in a manner to determine a complete set of active LBT subbands. For example, the WTRU may use a first monitoring pattern on one or more LBT subbands to receive a first indication that at least one LBT subband has been acquired. WTRU may (e.g., upon receiving a first indication) use a second monitoring pattern on one or more LBT subbands (e.g., to receive a second indication). The second indication may indicate or provide the WTRU with more information about a whole/full set of active LBT subbands.

In an example, a second monitoring pattern may be determined as a function of one or more LBT subbands where the WTRU received the first indication. For example, a WTRU (e.g., having received an indication in a first LBT subband) may adapt the WTRU's monitoring pattern in a manner that enables the WTRU to have a greater probability of receiving a full COT structure indication (e.g., in the first detected LBT subband).

A WTRU may receive and/or interpret scheduling information. A WTRU may (e.g., be configured to) determine scheduling information, for example, based on one or more LBT subbands that may be associated with an active COT. A WTRU may be aware of an LBT subband that is active, at least at the beginning of a COT. The WTRU may expect to be scheduled (e.g., only) in an LBT subband for which it has received an indication that the COT is active, for example, until (e.g., further) indication of a full set of active LBT subbands. A WTRU may interpret a scheduling grant to point to resources on an LBT subband for which it receives the grant, for example, at least until further indication of the full set of active LBT subbands. In examples, a WTRU may detect a DM-RS and/or GC-PDCCH indicating that a first LBT subband is active. The WTRU may expect any (e.g., zero or more) scheduling grants to be relevant (e.g., only) to the indicated first active LBT subband, for example, until the WTRU receives an indication of a full set of active LBT subbands. A scheduling grant occurring prior to an indication of a full set of active LBT subbands may include less resource allocation information. An LBT subband may be deemed known (e.g., implicitly), for example, based on the first active LBT subband indication. The number of bits used for resource allocation may be reduced. A smaller downlink control information (DCI) payload may be enabled, for example, for transmissions occurring at the beginning of a COT.

A WTRU's interpretation of a resource allocation in a scheduling grant may be a function of the number and/or set of acquired LBT subbands. The number and/or set of acquired LBT subbands may be different at the beginning of a COT compared to after receiving a COT structure indication (or COT structure indication update).

A WTRU may be configured to receive an indication associated with PDCCH monitoring. For example, a WTRU may be configured to receive an explicit indication to modify PDCCH monitoring. A WTRU may receive an indication to change its CORESET, search space, and/or PDCCH monitoring pattern. A WTRU may be configured with multiple monitoring patterns and/or may be indicated to change it. A WTRU may receive a (e.g., dynamic or semi-static) indication to change (e.g., a configuration of) one or more monitoring patterns. A (e.g., each) monitoring pattern may have an index. An (e.g., explicit) indication to change monitoring patterns may include an index of a (e.g., new or replacement) monitoring pattern to change to.

A WTRU may receive an indication to change to a second PDCCH monitoring pattern, for example, via a transmission received using a first PDCCH monitoring pattern. For example, a WTRU may receive a DCI in a PDCCH candidate monitored as part of a first PDCCH monitoring pattern. A DCI may indicate a change to the WTRU's monitoring, for example, from a first PDCCH monitoring pattern to a second PDCCH monitoring pattern. A WTRU may change monitoring based on the indication.

A new/replacement/changed PDCCH (e.g., the second PDCCH) monitoring pattern may change one or more of the following: the set of CORESETs actively monitored, the set of search spaces actively monitored, the set of LBT subbands actively monitored, the set of PDCCH candidates actively monitored, and/or the like.

An (e.g., explicit) indication to use a PDCCH monitoring pattern may include or may be associated with a time duration for which the PDCCH monitoring pattern is valid. For example, a WTRU may be in an active COT that has a fixed duration. The WTRU may (e.g., be configured to) assume, for example, that an indication to switch to a different PDCCH monitoring pattern is valid until the end of the active COT. For example, any indication to switch to a different PDCCH monitoring pattern may be assumed by the WTRU to be valid only until the end of the current COT. An (e.g., explicit) indication to use a PDCCH monitoring pattern may be associated with a validity timer. A WTRU may (e.g., without another indication) fall back to a default PDCCH monitoring pattern, for example, upon expiration of the validity timer. A default PDCCH monitoring pattern may be, for example, an out of COT monitoring pattern or a (e.g., first) monitoring pattern determined or indicated at the beginning of a COT (e.g. based on the first detected LBT subband(s)). An (e.g., explicit) indication to use and/or modify a PDCCH monitoring pattern may be received, for example, on one or more of a WTRU specific, cell specific, or group common PDCCH.

A WTRU may be configured with multiple CORESETs. A WTRU may be configured to monitor some or all of multiple CORESETs. A WTRU may maintain separate lists of configured and/or active CORESETs, for example, to reduce blind detection and/or channel estimation complexity with monitoring multiple (e.g., a relatively large number of) CORESETs. A WTRU may (e.g., at a given moment) attempt blind detection of PDCCH candidates on a subset of CORESETs. For example, a WTRU may be configured with a set of x CORESETs. A WTRU may (e.g., at any given moment) attempt blind detection of (e.g., only) PDCCH candidates on a subset of CORESETs (e.g. y CORESETs where y may be less than or equal to x). The subset of CORSETs may be deemed active CORESETs.

A WTRU may be configured with a maximum value of y (e.g. 3) CORESETs. A WTRU may determine the number and/or set of CORESETs the WTRU may monitor, for example, based on the maximum value of y (e.g. y_max). A WTRU may determine the number and/or set of CORESETs the WTRU may monitor as a function of one or more of the following: a set of configured CORESETs, a set of available CORESETs, a priority of a (e.g., each) CORESET, y_max, and/or the like. Configured CORESETs may include, for example, x semi-statically configured CORESETs. Available CORESETs may include, for example, CORESETs located in active LBT subbands. The priority of a CORESET may be determined, for example, as a function of CORESET index. A maximum value of y (e.g. y_max) may be indicated (e.g., in an explicit indication) by a network.

In examples, a WTRU may receive a first indication at the start of a COT indicating that a subset of LBT subbands are active. The WTRU may determine a first set of active CORESETs, for example, as a function of the active LBT subbands. A WTRU may receive an update on the set of active LBT subbands. The update may, for example, increase the number of active LBT subbands. The WTRU may modify its set of active CORESETs, for example, based on the updated set of LBT subbands. In examples, a WTRU may receive an (e.g., explicit) indication to change one or more PDCCH monitoring patterns, which may affect the set y of active CORESETs.

A WTRU may be configured to determine channel access priority. The channel access priority may be indicated by channel access categories (CACs). A gNB may control category 2 (CAT2) UL transmissions (e.g., LBT without random back-off). A gNB may control CAT2 UL transmissions, for example, if and/or when they fall in a gNB COT (e.g., including a CG).

A WTRU may be (pre)configured with a set of CACs to be used for uplink transmissions. One or more CACs may be used for determining logical channel restriction. For example, a WTRU may be pre-configured with CAC 2 and CAC 4. A WTRU may determine an applicable CAC for an uplink transmission in multiple steps (e.g., in two steps). A WTRU may (e.g., in a first step) receive an indication from a gNB. A WTRU may (e.g., in a second step) determine a CAC, for example, based on a received indication and/or other conditions. For example, a gNB may indicate (e.g., transmit) the gNB's COT to WTRUs in a cell. A CAC may be chosen, for example, based on a WTRU's previous transmissions state. A previous transmissions state may include, for example, an acknowledged (ACK) or not acknowledged (NACK) indication was not received. A gNB may provide an indication to a WTRU. A WTRU may determine a CAC based on the indication and/or one or more conditions.

A WTRU may receive an indication from a network node (e.g., a gNB). In examples, a WTRU may be configured to receive an indication from the gNB, which the WTRU may use, for example, to determine a CAC. The WTRU may determine channel access priority, for example, using the CAC. An indication may include or may be transmitted/received, for example, via one or more (e.g., a combination) of the following: a WTRU-specific DCI; a group-common (GC) DCI; a COT indication; reference signal(s) (RS(s)); and/or the like.

An indication (e.g., from a gNB) may be received, for example, via DCI (e.g., a WTRU-specific DCI.) For example, a WTRU may receive a DCI activating an uplink configured as grant type 2. A WTRU may receive a DCI requesting CSI feedback. A WTRU-specific DCI may schedule a downlink data transmission. The WTRU may determine a CAP associated with a COT using the indication received via the DCI.

An indication (e.g., from a gNB) may be received, for example, via a group-common DCI. A group common DCI may include one or more of a downlink feedback indication, a slot format indication, a pre-emption indication, and/or the like. The WTRU may determine a CAP associated with a COT using the indication received via the DCI.

An indication (e.g., from a gNB) may include, for example, a COT indication. A COT indication may include a COT structure and/or LBT sub-bands/carriers for downlink transmissions. A COT structure may include, for example, DL symbols, flexible symbols, UL symbols, and/or the like. The WTRU may determine a CAP associated with a COT using the COT indication (e.g., COT structure indication).

An indication (e.g., from a gNB) may be received, for example, via one or more reference signals (e.g., DM-RS and/or CSI-RS). A CAP associated with a COT may be determined using a reference signal configuration. For example, a gNB may configure a WTRU with multiple reference signals. A (e.g., each) configuration (e.g., among multiple configurations) may be associated with a CAC. In an example, a first (e.g., RS) configuration may be associated with a first CAP (e.g., associated with LBT cat2), and a second (e.g., RS) configuration may be associated with a second CAP (e.g., associated with LBT cat4). A WTRU may determine a CAC, for example, based on (e.g., upon detecting) a reference signal. The WTRU may determine a first channel access priority based on a first reference signal configuration and determine a second channel access priority based on a second reference signal configuration that differs from the first reference signal configuration.

A WTRU may (e.g., be triggered to) change (e.g., reduce) a set of allowed CACs to be considered (e.g., during a next step), for example, based on a gNB indication (e.g., operating as a trigger). For example, a WTRU may be pre-configured with four CACs: CAC 1, 2, 3 and 4. A gNB indication may trigger the WTRU to reduce the four CACs to two CACs (e.g., CAC 2 and 4) to be considered during the next step. A WTRU may select an applicable CAC during the second step from CAC 2 and 4, for example, based on the gNB indication (e.g., provided/received as described herein).

A WTRU may determine a CAC, for example, based (e.g., at least in part) on an indication from a network node (e.g., a gNB). A WTRU may be configured to determine a CAC, for example, based (e.g., at least in part) on one or more conditions. A WTRU (e.g., having received a gNB indication, such as in a form described herein) may be configured to determine a CAC based on one or more (e.g., a combination) of one or more conditions including, for example, one or more of the following: a starting time of an uplink transmission; a transmission duration of an uplink grant; whether a transport block (TB) to be transmitted is a retransmission; the number of retransmissions/repetitions already performed; a previously used CAC for a resource; a number of failed channel access attempts; whether a previous uplink transmission opportunity was pre-empted; and/or the like.

A WTRU may be configured to determine a CAC, for example, based on a starting time of an uplink transmission. In examples, a starting time of an uplink transmission may be based on the starting time of the uplink transmission with respect to the end of a DL burst. For example, a WTRU may be configured with a configured grant type 2 in the second symbol of slot n. A WTRU may (e.g., during a first step) receive a COT indication (e.g., from a network node) in slot n-4 indicating that the DL burst starts from slot n-4 and ends in slot n-1. The WTRU may determine that the gap between the DL burst and the starting time is less than X symbols. The WTRU may use a first CAC (e.g., CAC 1), for example, if the offset X is between X1 and X2. The WTRU may use a second CAC (e.g., CAC 2), for example, if the offset X is between X2 and X3.

In examples, a starting time of an uplink transmission may be based on a starting time of an uplink transmission with respect to a receiving time of a group common DCI and/or a WTRU-specific DCI. A WTRU may determine a CAC, for example, based on an offset X between an ending symbol of a PDCCH carrying a DCI to the start of an uplink transmission. A WTRU may use a first CAC (e.g., CAC 1), for example, if the offset X is between X1 and X2. A WTRU may use a second CAC (e.g., CAC 2), for example, if the offset X is between X2 and X3.

In examples, a starting time of an uplink transmission may be based on a starting time of an uplink transmission with respect to a receiving time of a reference signal (e.g. DM-RS and/or CSI-RS).

A WTRU may be configured to determine a CAC, for example, based on the transmission duration of an uplink grant. A WTRU may determine a CAC, for example, based on a time domain resource allocation for an uplink transmission.

In examples, a time domain resource allocation for an uplink transmission may be X symbols in duration. A WTRU may use a first CAC (e.g., CAC 1), for example, if X is between X1 and X2. A WTRU may use a second CAC (e.g., CAC 2), for example, if X is between X2 and X3.

A CAC determination may (e.g., alternatively) be based on a comparison of the time domain resource allocation with X symbols to the time duration of the DL burst with Y symbols. For example, a WTRU may use a second CAC (e.g., CAC 2), for example, if $X<aY$, where a may be configured (e.g., by the WTRU, in an indication to the WTRU, as a fixed value, and/or the like).

A CAC determination may (e.g., alternatively) be based on a comparison of the time domain resource allocation with X symbols to the time duration of the DL burst plus the time gap between the end of DL burst to the start of the uplink transmission. For example, the time duration of a DL burst may include Y symbols. A time gap between the end of DL burst to the start of an uplink transmission may include Z symbols. A WTRU may use a second CAC (e.g., CAC 2), for example, if $X<\alpha(Y+Z)$, where $\alpha$ may be configured (e.g., by the WTRU, in an indication to the WTRU, as a fixed value, and/or the like).

A WTRU may be configured to determine a CAC, for example, based on whether a TB to be transmitted is a retransmission or a first/different transmission. For example, the WTRU may use CAC 2 for a retransmission and CAC 4 for a first/different transmission or vice versa.

A WTRU may be configured to determine a CAC, for example, based on the number of retransmission(s)/repetition(s) already performed. A WTRU may (e.g., for an ongoing transmission of a TB) determine a CAC, for example, based on the number of retransmission(s)/repetition(s) (e.g., of the TB) already performed. A WTRU may use a first CAC (e.g., CAC 4), for example, if the number of retransmissions performed is below a configured threshold. The WTRU may use a second CAC (e.g., CAC2), for example, if the number of retransmissions performed is not below a configured threshold.

A WTRU may be configured to determine a CAC, for example, based on a previously used CAC for a (e.g., the same) resource (e.g. a configured grant resource). In examples, a WTRU may use CAC 2 within a current gNB shared COT, for example, if the WTRU used CAC 4 during a previous gNB shared COT. In examples, a WTRU may use CAC 2 in a current gNB shared COT, for example, based on the number of consecutive uses of CAC 4 in a previous gNB shared COT.

A WTRU may be configured to determine a CAC, for example, based on a number of failed channel accesses. A WTRU may be configured to determine a CAC, for example, based on a number of failed channel accesses due to an LBT failure on a (e.g., the same) resource. The same resource may include a configured grant resource.

A WTRU may be configured to determine a CAC, for example, based on whether a previous uplink transmission opportunity was pre-empted or not. For example, a WTRU may be configured with an uplink configured grant within a first gNB shared COT. The WTRU may receive an uplink pre-emption indication. The WTRU may cancel the uplink transmission. The WTRU may use CAC 2 to transmit using the configured grant resource, for example, during the next shared gNB COT.

The determined and/or indicated CAC may be used to determine a logical channel restriction, for example, by indicating a channel access priority.

A WTRU may be configured to use a default CAC, for example, if no conditions (e.g., as described herein) are satisfied and/or if a gNB indication was not received.

A WTRU may be configured to receive an LBT type/priority indication. A WTRU and/or a network (e.g., network node(s)) may be configured to use signaling support for LBT type/priority indication. The priority indication may indicate a channel access priority. The channel access priority may be indicated by a CAPC.

A WTRU may be configured to send an indication of channel access priority (e.g., a CAPC) used to acquire a COT. A COT may be acquired, for example, if the COT is initiated on a resource(s) (e.g., channel) that may have been determined as idle. The COT may be acquired, for example, per the outcome of LBT. A WTRU may indicate to a network a CAPC used with an LBT procedure, for example, based on acquisition of (e.g., upon acquiring) a COT for an uplink transmission. A WTRU may indicate one or more logical channels that may be used to determine the CAPC of a channel acquisition. An indication (e.g., of logical channel (s)) may be more robust than the data transmitted, for example, to support (e.g., immediate) immediate use of the information by a network.

A WTRU may (e.g., be configured to) indicate the CAPC used for an LBT explicitly or implicitly. An (e.g., explicit) indication by the WTRU may include one or more of the following: uplink control information (UCI) added to a transmission; a bit-string added to data; and/or the like. An (e.g., explicit) indication by a WTRU may include a UCI added to a transmission. A WTRU may indicate a CAPC as part of a UCI. A UCI for a CAPC may be mapped to resources close to a DM-RS. Decoding error performance may be improved. A UCI for a CAPC may include a cyclic redundancy check (CRC). Robustness may be improved. A UCI for a CAPC may be transmitted by a WTRU in a pre-determined resource (e.g., a symbol of a slot). For example, the first symbol of an UL transmission may include a UCI for a CAPC, which may provide more time for a gNB to determine the CAPC to prepare for upcoming scheduling opportunities.

An (e.g., explicit) indication by a WTRU may include a bit-string added to data. A WTRU may append or prepend a bit-string to TB codeblocks. A bit-string may indicate a CAPC used for channel acquisition. A bit-string may be encoded and/or may include a CRC, which may improve robustness.

An (e.g., implicit) indication by a WTRU of a CAPC used for channel acquisition may include one or more of the following: an interlace used for transmission; a parameter of a DM-RS; a parameter of a transmission; and/or the like.

An (e.g., implicit) indication by a WTRU of a CAPC may include a resource (e.g., an interlace) used for a transmission. A WTRU may select the transmission resource, for example, based on the CAPC used to access a channel.

An (e.g., implicit) indication by a WTRU of a CAPC may include a parameter of a DM-RS. A parameter of the DM-RS may be selected, for example, based on a CAPC used to access a channel. A parameter may include, for example, one or more of sequence or resource mapping and/or the like.

An (e.g., implicit) indication by a WTRU of a CAPC may include a parameter of a transmission. A duration of a transmission may indicate a CAPC used to access a channel. For example, the duration of a first transmission may be selected as a function of a CAPC used to access a channel. The antenna ports used for a first transmission may indicate or convey a CAPC used for channel acquisition. A WTRU may be scheduled with a set of parameters. A WTRU may select from the set of parameters, for example, as a function of the CAPC used for channel acquisition. The set of parameters may include, for example, a set of TB or modulation and coding scheme (MCS) values.

Figure 4:
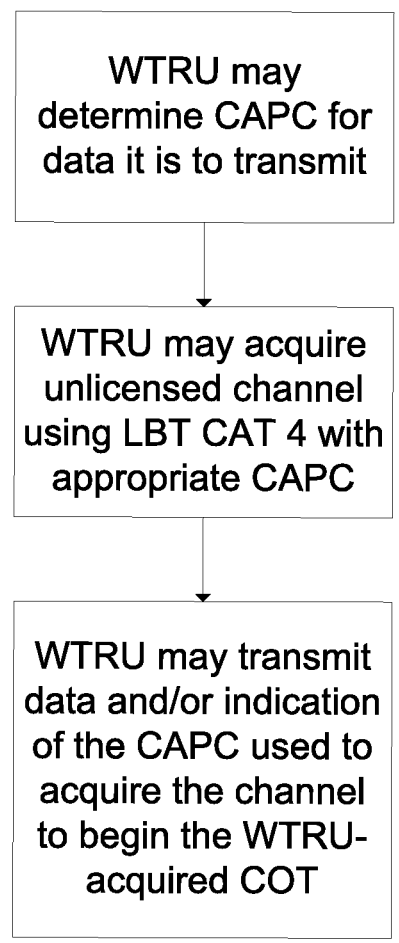
FIG. 4 illustrates an example for indicating a channel access priority (e.g., a CAPC) that may be used to acquire a shared COT.

FIG. 4 illustrates an example of indicating a channel access priority (e.g., a CAPC) that may be used to acquire a shared COT. As shown by example in FIG. 4, a WTRU may select a CAPC, for example, based on the data that the WTRU is to transmit in a UL. The WTRU may acquire an unlicensed channel, for example, using LBT CAT4 with an appropriate CAPC. The WTRU may indicate to the network the CAPC used. The network may (e.g., effectively) share the COT with the WTRU.

Implementations(s) and/or feature(s) herein may be described in terms of behaviors (e.g., actions) of a WTRU. In examples, the behaviors may be performed by an entity such as a NW node or other devices, which may not include WTRU functionality(ies). In some examples (e.g., certain use cases or certain time instances), the entity or other devices may behave like a WTRU. The one or more examples herein may be equally applicable to the entity or other devices.

Figure 5:
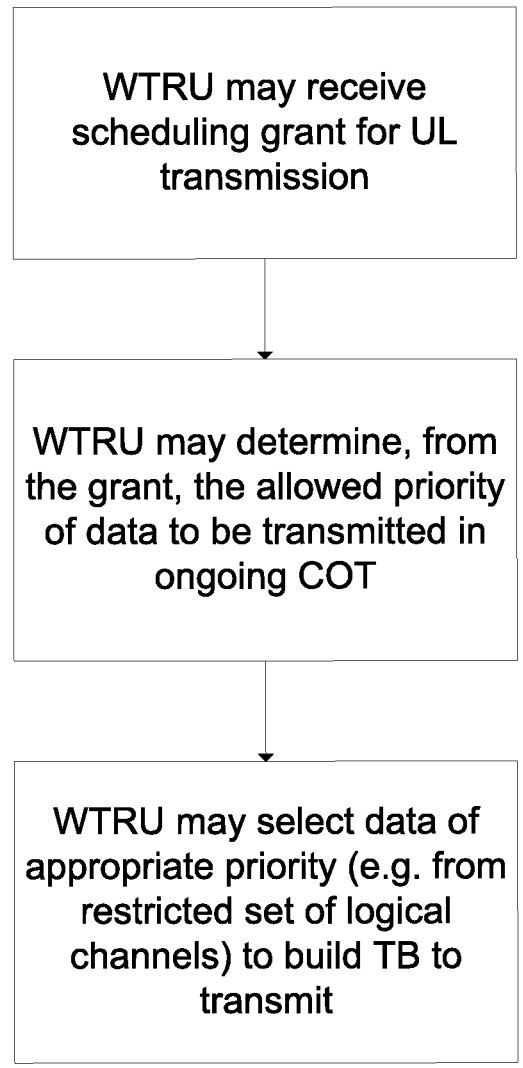
FIG. 5 illustrates an example of determining a logical channel restriction based on priority associated with a COT (e.g., as shown in the example in FIG. 6).

A WTRU may be configured with or configured to determine a logical channel restriction. A WTRU may be scheduled with a UL transmission within a COT (e.g., an ongoing COT). A WTRU may be instructed (e.g., may receive an instruction or an indication to be used for logical channel restriction) with a logical channel restriction, for example, in a scheduling DCI. The scheduling DCI may comprise a grant or allocation. A WTRU may determine the logical channel restriction, for example, based on a received instruction or indication. A WTRU may receive an indication in a DCI and determine the CAP associated with a COT using the indication. A WTRU may determine the logical channels whose data may be included in an uplink transmission within a COT, for example, based on a restriction (e.g., logical channel restriction). A restriction may be based on a priority level (e.g., CAP) and/or may indicate a logical channel. In some examples, an indication of a priority level may be equivalent to an indication of a logical channel (e.g., which may be associated with a priority level). A logical channel may be associated with a priority level (e.g., logical channel priority associated with the logical channel). As shown in FIG. 5, a WTRU may select data of appropriate priority to build TB to transmit. To select data of appropriate priority to build TB to transmit (e.g., as shown in FIG. 5), the WTRU may determine the logical channel priority (e.g., LCH priority), and the WTRU may determine whether the logical channel is associated with a channel access priority that is equal to or higher than the channel access priority associated with a COT based on the LCH priority associated with the logical channel and the channel access priority associated with the COT. As shown in FIG. 5, data of appropriate priority may be selected. For example, if the logical channel is associated with a channel access priority that is equal to or higher than the channel access priority associated with a COT, the logical channel may be allowed to be included in the transmission by the WTRU during the COT.

Figure 6:
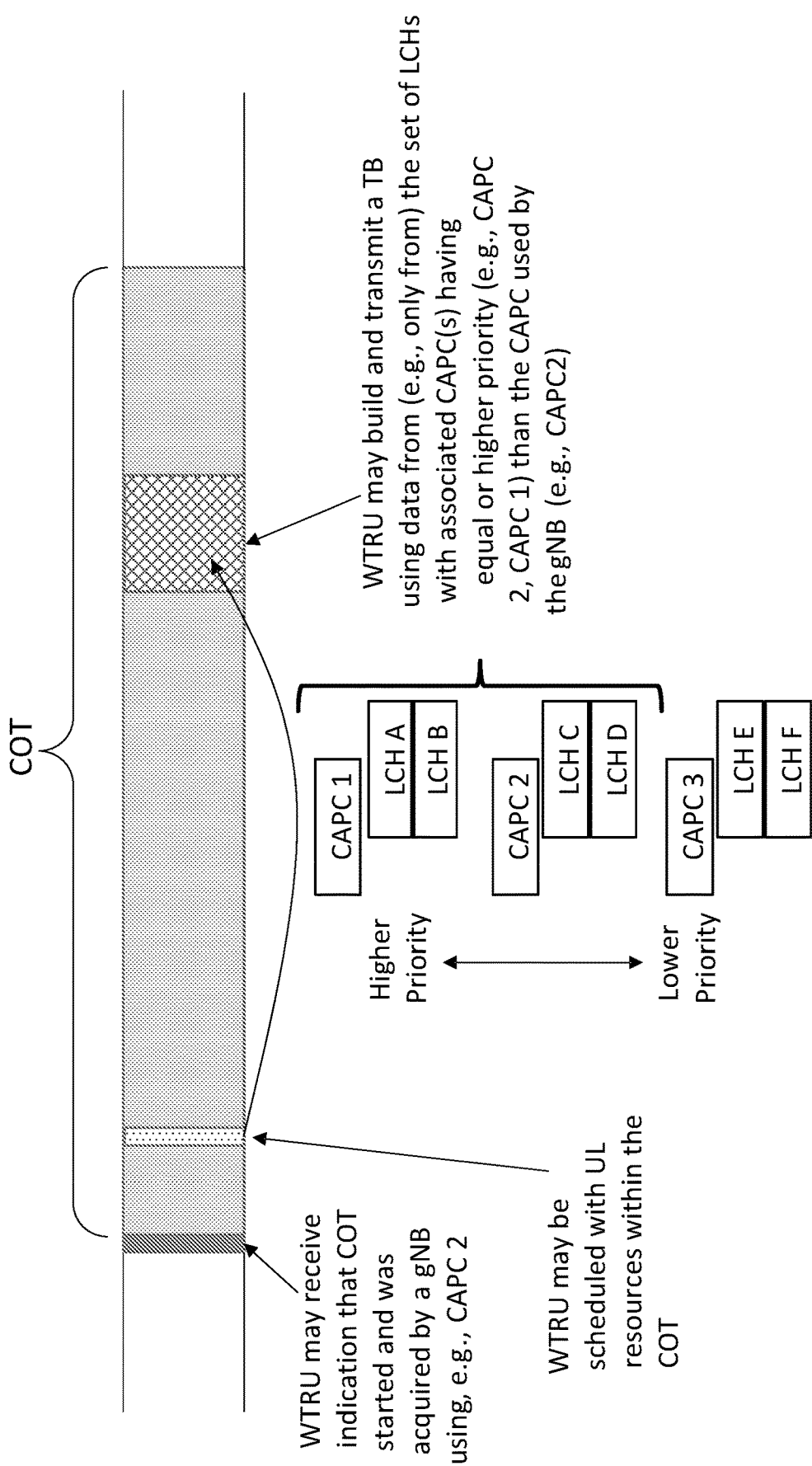
FIG. 6 illustrates an example of sharing COT based on CAP (e.g., CAPC) associated with the COT.

A determination of the priority level may indicate which logical channel to include in the transmission by a WTRU. A WTRU may include data from logical channels with the same priority and/or higher priority than the priority level and/or logical channel (e.g., associated with a priority level) indicated in a restriction. A same priority level may include a priority level that is equal to the priority level indicated in a restriction. As shown in FIG. 6, the WTRU may determine whether a logical channel is allowed to be included in the scheduled transmission using the determined logical channel restriction. For example, a restriction may indicate a priority level (e.g., CAP), and a WTRU may include data (e.g., in a UL transmission) from logical channels associated with the same and/or higher priority than the indicated priority level (e.g., only from logical channels associated with the same and/or higher priority than the indicated priority level). As shown in FIG. 6, the transmission may include a logical channel if the determined logical channel restriction allows the inclusion of the logical channel in the transmission.

A WTRU may monitor for the presence of a signal indicating a channel access priority (e.g., CAPC) used to acquire a COT. The channel access priority may indicate a priority used by a WTRU or a base station to acquire a COT, for example, to access a channel. A higher CAPC number/value may indicate a lower priority (e.g., used to acquire the COT). In examples (e.g., for grant-free or configured grant UL transmissions occurring within an active COT), a WTRU may monitor for the presence of a signal indicating the CAPC used to acquire the COT (e.g., prior to transmission of the signal). As shown in FIG. 6, a WTRU may determine a logical channel restriction based on an indication received from gNB that includes a CAPC associated with the COT. A WTRU may determine a CAPC, for example, based on (e.g., by receiving) a COT structure indication. The COT structure indication may be received via a DCI (e.g., a DCI used for COT structure indication). In some examples, the DCI may differ from a scheduling DCI. A WTRU may (e.g., alternatively and/or additionally) determine a CAPC, for example, based on (e.g., by receiving) a signal used to trigger CG transmissions. A WTRU may (e.g., alternatively and/or additionally) determine a CAPC, for example, as part of a parameter of a gNB transmission within a COT (e.g. a DM-RS or a GC-PDCCH).

FIG. 5 illustrates an example of determining a logical channel restriction based on a priority (e.g., a channel access priority) associated with a COT, for example, as shown in the example in FIG. 6. As shown in FIG. 5, an indication of priority (e.g., a CAPC) may be received and/or used to select what to transmit in a shared COT. A WTRU may receive an indication of CAPC used (e.g., by a network) to acquire/start a COT. The WTRU may receive an indication of the CAPC, for example, in a scheduling grant for a UL transmission. The scheduling grant may schedule a resource used for the transmission that is sent during the COT. The resource may occur during the COT. The scheduling grant may include the CAPC used by the network if and/or when acquiring the COT, e.g., ongoing COT. The WTRU may determine a priority associated with the COT. The WTRU may determine data that the WTRU may transmit (e.g., determine data with applicable/sufficient priority and/or in compliance with a restriction) during the COT based on the priority (e.g., allowed priority) included in the scheduling grant. The WTRU may determine a restricted set of logical channels that the WTRU may use to build a TB for a scheduled transmission (e.g., as shown in the example in FIG. 6). As shown in FIG. 5, a TB may be built to include data (e.g., data associated with a logical channel) of appropriate priority by multiplexing a logical channel associated with the data on the TB, for example, if the logical channel restriction allows the inclusion of the logical channel in the transmission. In an example, the set of logical channels that may be used by the WTRU for transmission may be restricted. The WTRU may select data from a logical channel (e.g., any logical channel) from the set of logical channels (e.g., the restricted set).

In an example, a WTRU may determine that the WTRU is to transmit data associated with a lower priority than the priority allowed according to a logical channel restriction. The WTRU may, for example, abort a Type 1 or Type 2 LBT procedure (e.g. a procedure that may be used for COT sharing) and/or perform a Type 4 LBT procedure with CAPC acceptable for the transmission requirements. A WTRU may be configured with the ability to switch from a Type 1 or Type 2 LBT procedure to a Type 4 LBT procedure.

FIG. 6 illustrates an example of sharing COT based on CAP (e.g., CAPC) associated with the COT. As shown in FIG. 6, a WTRU may receive and use a network indication of a shared COT and associated CAP (e.g., CAPC) to transmit in the shared COT data from logical channels consistent with the CAP (e.g., CAPC). A WTRU may receive an indication (e.g., from a network) about a (e.g., network acquired) COT. An indication may indicate information associated with the COT, such as one or more of the following, start time, duration, acquiring node (e.g., gNB), priority (e.g., CAP or CAPC), scheduling, and/or the like. The WTRU may be scheduled with UL resources within the COT.

The WTRU may prepare to transmit (e.g., a TB) in the COT. The WTRU may determine a CAP (e.g., CAPC) associated with the network-acquired COT (e.g., as described herein). The WTRU may determine whether there are any restrictions on logical channels that may be used in the scheduled transmission in the COT based on the CAP associated with the COT (e.g., as described herein). The WTRU may determine whether a logical channel is allowed to be included in the scheduled transmission using the determined logical channel restriction (e.g., as described herein). The transmission may include a logical channel if the determined logical channel restriction allows the inclusion of the logical channel in the transmission. The WTRU may build and transmit a TB based on the foregoing determinations. In an example (e.g., as shown in FIG. 6), the WTRU may use data from the set of LCHs with associated CAPC(s) having equal or higher priority (e.g., CAPC 2, CAPC 1) than the CAPC used by the gNB (e.g., CAPC 2). The WTRU may send the transmission during the COT (e.g., via a subband). A WTRU may indicate a behavior. In an example, a WTRU may indicate a behavior comprising use of a Type 4 LBT, for example, upon using a Type 4 LBT procedure to acquire a channel within an active COT. The WTRU may indicate the use of a Type 4 LBT and/or a different CAPC, for example, using an approach similar to an approach described herein to indicate a CAPC used for a WTRU-acquired COT. Using a Type 4 LBT may re-initiate a COT and/or may affect COT duration. A WTRU may monitor a COT structure indication, for example, to determine an updated COT duration.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A wireless transmit/receive unit (WTRU) comprising:
   a processor configured to:
   receive an indication of a listen before talk (LBT) parameter associated with a channel occupancy time (COT)-acquirement of a base station;
   determine a logical channel restriction associated with a COT based on the indication of the LBT parameter, wherein the logical channel restriction allows inclusion of data associated with a logical channel associated with a channel access priority that is higher than a channel access priority threshold associated with the COT;

determine, based on the logical channel restriction, whether data associated with a first logical channel is allowed to be included in a transmission, wherein the transmission is to be sent during the COT; and send the transmission during the COT via a subband, wherein the transmission includes the data associated with the first logical channel if the logical channel restriction allows inclusion of the data associated with the first logical channel in the transmission.

2. The WTRU of claim 1, wherein the logical channel restriction forbids inclusion of data associated with a logical channel associated with a channel access priority that is lower than the channel access priority threshold associated with the COT.

3. The WTRU of claim 1, wherein the LBT parameter is a channel access priority class used to acquire the subband for the COT.

4. The WTRU of claim 3, wherein the channel access priority threshold associated with the COT is indicated by the channel access priority class.

5. The WTRU of claim 1, wherein the indication of the LBT parameter associated with the COT is received in a scheduling grant, wherein the scheduling grant schedules a resource used for the transmission.

6. The WTRU of claim 1, wherein the first logical channel is multiplexed on a transport block (TB) if the first logical channel is associated with a channel access priority that is higher than the channel access priority threshold associated with the COT, wherein the TB is included in the transmission.

7. The WTRU of claim 1, wherein the indication of the LBT parameter associated with the COT is received via a COT structure indication, wherein the processor is further configured to determine the channel access priority threshold associated with the COT based on the COT structure indication, and the logical channel restriction is determined based on the channel access priority threshold associated with the COT.

8. The WTRU of claim 1, wherein the indication of the LBT parameter associated with the COT is received from the base station via downlink control information (DCI), wherein the processor is further configured to determine the channel access priority threshold associated with the COT based on the indication received via the DCI, and the logical channel restriction is determined based on the channel access priority threshold associated with the COT.

9. The WTRU of claim 1, wherein the processor is further configured to:
determine a reference signal configuration; and
determine the channel access priority threshold associated with the COT based on the reference signal configuration, wherein the logical channel restriction is determined based on the channel access priority threshold associated with the COT.

10. The WTRU of claim 1, wherein the processor is further configured to:
determine a resource that occurs during the COT, wherein the transmission is sent using the resource.

11. The WTRU of claim 1, wherein the processor is further configured to:
determine a logical channel (LCH) priority associated with the first logical channel; and
determine whether first the logical channel is associated with a channel access priority that is higher than the channel access priority threshold associated with the COT based on the LCH priority associated with the first logical channel and the channel access priority threshold associated with the COT, wherein the determination of whether the data associated with the first logical channel is allowed to be included in the transmission by the WTRU during the COT is based on the determination of whether the first logical channel is associated with the channel access priority that or higher than the channel access priority threshold associated with the COT.

12. A method comprising:
receiving an indication of a listen before talk (LBT) parameter associated with a channel occupancy time (COT)-acquirement of a base station;
determining a logical channel restriction associated with a COT based on the indication of the LBT parameter, wherein the logical channel restriction allows inclusion of data associated with a logical channel associated with a channel access priority that is higher than a channel access priority threshold associated with the COT;
determining, based on the logical channel restriction, whether data associated with a first logical channel is allowed to be included in a transmission, wherein the transmission is to be sent during the COT; and
sending the transmission during the COT via a subband, wherein the transmission includes the data associated with the first logical channel if the logical channel restriction allows the inclusion of the data associated with the first logical channel in the transmission.

13. The method of claim 12, wherein the logical channel restriction forbids inclusion of data associated with a logical channel associated with a channel access priority that is lower than the channel access priority threshold associated with the COT.

14. The method of claim 12, wherein the LBT parameter is a channel access priority class used to acquire the subband for the COT.

15. The method of claim 12, wherein the indication of the LBT parameter associated with the COT is received in a scheduling grant, wherein the scheduling grant schedules a resource used for the transmission.

16. The method of claim 12, wherein the first logical channel is multiplexed on a transport block (TB) if the first logical channel is associated with a channel access priority that is higher than the channel access priority threshold associated with the COT, wherein the TB is included in the transmission.

17. The method of claim 12, wherein the indication of the LBT parameter associated with the COT is received via a COT structure indication, wherein the method further comprises determining the channel access priority associated with the COT based on the COT structure indication, and the logical channel restriction is determined based on the channel access priority threshold associated with the COT.

18. The method of claim 12, wherein the indication of the LBT parameter associated with the COT comprises one or more of a COT structure indication received via downlink control information (DCI) or a reference signal configuration.

19. The method of claim 12, further comprising determining a resource that occurs during the COT, wherein the transmission is sent using the resource.

20. The method of claim 12, further comprising:
determining a logical channel (LCH) priority associated with the first logical channel; and
determining whether the first logical channel is associated with a channel access priority that is higher than the channel access priority threshold associated with the COT based on the LCH priority associated with the first logical channel and the channel access priority threshold associated with the COT, wherein the determination of whether the data associated with the first logical channel is allowed to be included in the transmission during the COT is based on the determination of whether the first logical channel is associated with the channel access priority that is higher than the channel access priority threshold associated with the COT.

* * * * *